United States Patent Office 3,785,996
Patented Jan. 15, 1974

3,785,996
FOUR-STEP PROCEDURE FOR REGENERATING A CATALYST CONTAINING PLATINUM, RHENIUM AND HALOGEN
John C. Hayes, Palatine, Ill., assignor to Universal Oil Products Company, Des Plaines, Ill.
No Drawing. Continuation-in-part of application Ser. No. 797,272, Feb. 6, 1969, now Patent No. 3,634,292. This application Aug. 26, 1971, Ser. No. 175,342
Int. Cl. B01j 11/18, 11/80; C10g 35/06
U.S. Cl. 252—415                17 Claims

ABSTRACT OF THE DISCLOSURE

A deactivated hydrocarbon conversion catalyst, which is a combination of a platinum group component, a rhenium component, and halogen component with a porous carrier material and which has been deactivated by deposition of carbonaceous materials thereon during a previous contacting with a hydrocarbon charge stock at an elevated temperature, is regenerated by the sequential steps of: (a) burning carbon therefrom at a relatively low temperature with a substantially sulfur compound-free gas stream containing $H_2O$ and a relatively small amount of $O_2$, (b) treating the resulting partially regenerated catalyst at a relatively higher temperature with a substantially sulfur compound-free gas stream containing a halogen or a halogen-containing compound, $H_2O$ and a relatively higher amount of $O_2$, (c) purging $O_2$ and $H_2O$ from contact with the resulting catalyst, and (d) subjecting the resulting catalyst to contact with a dry and sulfur compound-free hydrogen stream. Key features of the disclosed method are: (1) presence of water in the gas streams used in all steps except the reduction step; (2) careful control of the temperature used during each step; (3) adjustment of the halogen content of the catalyst immediately after the carbon-burning step and prior to the reduction step; (4) careful control over the composition of the gas streams used in the various steps thereof; and (5) exclusion of sulfur compounds from all gas streams utilized.

CROSS REFERENCES TO RELATED APPLICATIONS

This application is a continuation-in-part of my prior, copending application Ser. No. 797,272, filed Feb. 6, 1969, now U.S. Pat. 3,634,292.

The subject of the present invention is a four-step method for regenerating a coke-deactivated hydrocarbon conversion catalyst comprising a combination of a catalytically effective amounts of a platinum group component, a rhenium component, and a halogen component with a porous carrier material. More specifically, the present invention is a method for regenerating a deactivated hydrocarbon conversion catalyst comprising a combination of platinum, rhenium and halogen with an alumina carrier material where the catalyst has been deactivated by the deposition of carbonaceous materials thereon during a previous contacting with a hydrocarbon charge stock at an elevated temperature. In essence, the present invention provides a specific sequence of carbon-burning and catalyst treatment steps designed to result in a regenerated catalyst possessing activity, selectivity, and stability characteristics which are comparable to those observed with the fresh undeactivated catalyst.

Composites having a hydrogenation-dehydrogenation function and a cracking function are widely used today as catalysts in many industries, such as the petroleum and petrochemical industry, to accelerate a wide spectrum of hydrocarbon conversion reactions. Generally, the cracking function is thought to be associated with an acid-acting material of the porous, adsorptive, refractory oxide type which is typically utilized as the support or carrier for a heavy metal component such as one or more of the transition metals or compounds of the transition metals of Group V through VIII of the Periodic Table to which are generally attributed the hydrogenation-dehydrogenation function.

These catalytic composites are used to accelerate a wide variety of hydrocarbon conversion reactions such as hydrocracking, isomerization, dehydrogenation, hydrogenation, desulfurization, cyclization, alkylation, polymerization, cracking, hydroisomerization, etc. In many cases, the commercial applications of these catalysts are in processes where more than one of these reactions are proceeding simultaneously. An example of this type of process is reforming wherein a hydrocarbon feed stream containing paraffins and naphthenes is subjected to conditions which promote dehydrogenation of naphthenes to aromatics, dehydrocyclization of paraffins to aromatics, isomerization of paraffins and naphthenes, hydrocracking of naphthenes and paraffins and the like reactions, to produce an octane-rich or aromatic-rich product stream. Another example is a hydrocracking process wherein catalysts of this type are utilized to effect selective hydrogenation and cracking of high molecular weight unsaturated materials, selective hydrocracking of high molecular weight materials, and other like reactions, to produce a generally lower boiling, more valuable output stream. Yet another example is an isomerization process wherein a hydrocarbon fraction which is relatively rich in straight-chain paraffin components is contacted with a dual-function catalyst to produce an output stream rich in isoparaffin compounds.

Regardless of the reaction involved or the particular process involved, it is of critical importance that the dual-function catalyst exhibit not only the capability to initially perform the specified functions, but also that it has the capability to perform them satisfactorily for prolonged periods of time. The analytical terms used in the art to measure how well a particular catalyst performs its intended functions in a particular hydrocarbon reaction environment are activity, selectivity, and stability. And for purposes of discussion here, these terms are conveniently defined for a given charge stock as follows: (1) activity is a measure of the catalyst's ability to convert hydrocarbon reactants into products at a specified severity level where severity level means the conditions used—that is, the temperature, pressure, contact time, and presence of diluents such as $H_2$; (2) selectivity refers to the amount of the desired product and/or products obtained expressed as a function of the amount of hydrocarbons charged or converted; (3) stability refers to the rate of change with time of the activity and selectivity parameters—obviously the smaller rate implying the more stable catalyst. In a reforming process, for example, activity commonly refers to the amount of conversion that takes place for a given charge stock at a specified severity level and is typically measured by octane number of the $C_5+$ product stream; selectivity refers to the amount of $C_5+$ yield, relative to the amount of the charge stock, that is obtained at the particular severity level; and stability is typically equated to the rate of change with time of activity, as measured by octane number of $C_5+$ product, and of selectivity, as measured by $C_5+$ yield. Actually, the last statement is not strictly correct because generally a continuous reforming process is run to produce a constant octane $C_5+$ product with severity level being continuously adjusted to attain this result; and, furthermore, the severity level is for this process usually varied by adjusting the conversion temperature in the reaction zone so that, in point of fact, the rate of change of activity finds response in the rate of change of conversion temperature, and changes in this last parameter are customarily taken as indicative of activity stability.

As is well known to those skilled in the hydrocarbon conversion art, the principal cause of observed deactivation or instability of these dual-function catalysts when they are used in a hydrocarbon conversion reaction is associated with the formation of coke or carbonaceous materials on the surface of the catalyst during the course of the reaction. More specifically, the conditions utilized in these hydrocarbon conversion processes typically result in the formation of heavy, black, solid or semi-solid carbonaceous material which deposits on the surface of the catalyst and gradually reduces its activity by shielding its active sites from the reactants. Recently, there has been developed a new dual-function, bimetallic catalytic composite which possesses improved activity, selectivity, and stability characteristics when it is employed in a process for the conversion of hydrocarbons of the type which has heretofore utilized dual-function catalytic composites such as processes for isomerization, dehydrogenation, hydrogenation, alkylation, transalkylation, dealkylation, cyclization, dehydrocyclization, cracking, hydrocracking, reforming, and the like processes. In particular, it has been established that a combination of catalytically effective amounts of a platinum group component, a rhenium component and a halogen component with a porous carrier material can enable the performance of hydrocarbon conversion processes that have traditionally utilized dual-function catalysts to be substantially improved. For example, it has been demonstrated that the overall performance characteristics of a catalytic reforming process can be sharply improved by the use of this recently developed, bimetallic catalytic composite. Not unexpectedly, the deactivation of this bimetallic, dual-function hydrocarbon conversion catalyst occurs in much the same manner as for any other hydrocarbon conversion catalyst having a platinum group component when it is employed in the hydrocarbon conversion service. Accordingly, the principal mode of deactivation of this recently developed bimetallic catalyst is the deposition of coke, volatile hydrocarbons, and other carbonaceous material on the surface of the catalyst which eventually cover the catalytically active sites of the catalyst, thereby shielding them from the reactants or blocking access of the reactants to the sites. These deposits cause a gradual decline in activity and selectivity of the catalyst and a gradual loss of its capability to perform its intended function. Depending somewhat on the performance requirements imposed on the process utilizing the bimetallic catalyst, at some point in time the catalyst becomes so clogged with carbonaceous materials that it either must be regenerated or discarded. Heretofore, substantial difficulty has been encountered in regenerating this recently developed bimetallic hydrocarbon conversion catalyst. More specifically, it has been ascertained that the application of conventional regeneration techniques which have heretofore been practiced in the art of regenerating monometallic, dual-function, platinum-containing hydrocarbon conversion catalysts, has not been successful in restoring the initial activity, selectivity, and stability characteristics of these bimetallic catalysts. Typically, the application of conventional carbon-burning procedure with oxygen-containing gases results in a regenerated catalyst having an extremely low activity and containing a reduced amount of halogen component. Attempts at restoring the initial level of halogen contained in the catalyst by well-known halogen adjustment procedures on the regenerated catalyst have been uniformly unsuccessful. Accordingly, the problem addressed by the present invention is the regeneration of a carbonaceous material-deactivated hydrocarbon conversion catalyst comprising a combination of catalytically effective amounts of a platinum group component, a rhenium component, and a halogen component with a porous carrier material.

The conception of the present invention was facilitated by my recognition that the adverse effects that have heretofore been commonly encountered in attempts to regenerate this bimetallic catalyst by conventional carbon-burning techniques were caused by a failure to carefully control the composition of the gas streams used in the various steps of the regeneration method coupled with a failure to carefully control the temperature used in each of the steps of the regeneration procedure. I have now found a specific sequence of steps which enable the successful regeneration of this recently developed bimetallic hydrocarbon conversion catalyst, and essential features of my method are: careful control of the temperature of the gas stream utilized in each of the steps, presence of water in all steps except the reduction step, adjustment of the halogen content of the catalyst immediately after removal of carbonaceous material from the catalyst but prior to the reduction step, careful control of the composition of the gas streams used in all steps, and exclusion of sulfur compounds from all gas streams utilized.

In my prior application I disclosed a six-step regeneration procedure for this bimetallic catalyst where the catalyst after the carbon-burning step was subjected to a two-step oxygen-treating procedure prior to the halogen-treating step. The first oxygen-treating step was run at a high temperature, relative to the temperature used in th carbon-burning step, with a relatively small amount of $O_2$, and the second oxygen-treating step was run at higher temperature with a relatively larger amount of $O_2$. Now I have discerned that these two oxygen-treating steps can be eliminated from the procedure and the halogen-treating step can be performed immediately after the carbon-burning step if the temperature used in the halogen-treating step is at least 25° C. higher than that utilized in the carbon-burning step and if the amount of oxygen used in this halogen-treating step is substantially greater than that employed in the carbon-burning step. These modifications of the regeneration procedure disclosed in my prior application result in a substantial simplification of the procedure coupled with a marked decrease in the time required for regeneration.

It is, therefore, a principal object of the present invention to provide an improved method for regenerating a bimetallic hydrocarbon conversion catalyst comprising a combination of a platinum group component, a rhenium component, and a halogen component with a porous carrier material when the catalyst has been deactivated by contact with a hydrocarbon charge stock at elevated temperatures. A corollary object is to provide a solution to the problem of regenerating these recently-developed, high-performance bimetallic catalysts which solution enables the substantial restoration of the activity, selectivity, and stability characteristics of the original catalyst. An overall object is to extend the total catalyst life of these recently-developed catalysts and to obtain more efficient and effective use of these catalysts during their active life. Another object is to provide a regeneration method which adjusts the halogen content of the bimetallic catalyst to a high level during the course of the regeneration procedure.

In brief summary, the present invention is, in one broad embodiment, a method for regenerating a deactivated hydrocarbon conversion catalyst comprising a combination of a platinum group component, a rhenium component, and a halogen component with a porous carrier material when the catalyst has been deactivated by deposition of carbonaceous materials thereon during a previous contacting with a hydrocarbon charge stock at an elevated temperature. The first step of the method is the carbon-burning step and it involves contacting the deactivated catalyst with a substantially sulfur compound-free gaseous mixture, comprising about 0.2 to about 3 mole percent $O_2$ and about 0.02 to about 25 mole percent $H_2O$, at combustion conditions, including a temperature of about 350 to about 500° C. and a pressure sufficient to maintain flow of the mixture through the catalyst, for a first period sufficient to substantially remove this carbonaceous material therefrom. Following this first step, the catalyst resulting therefrom is subjected to a halogen-treating step by contacting it with a substantially sulfur compound-free gaseous mixture comprising about 4 to about 25 mole percent $O_2$, about 1 to about 30 mole percent $H_2O$, and about 0.05 to about 5 mole percent of a halogen or halogen-containing compound for a second period of at least about 0.5 to 10 hours at halogen-treating conditions including a temperature of at least about 25° C. higher than that utilized in the carbon-burning step and a pressure sufficient to maintain flow of the mixture through the catalyst. Thereafter, oxygen and water are purged from contact with the resulting catalyst by means of a dry gas stream. In the final step, the resulting dry catalyst is subjected to contact with a substantially water-free and sulfur compound-free hydrogen stream at reduction conditions, including a temperature of about 400 to about 600° C. and a pressure sufficient to maintain flow of the hydrogen stream through the catalyst, for a final period of at least about 0.5 to about 5 hours, thereby producing a regenerated hydrocarbon conversion catalyst having activity, selectivity, and stability characteristics comparable to those possessed initially by the fresh catalyst.

In brief summary, a preferred embodiment of the present invention is a method for regenerating a deactivated hydrocarbon conversion catalyst comprising a combination of a platinum component, a rhenium component and a chlorine component with an alumina carrier material, when the catalyst has been deactivated by deposition of carbonaceous materials thereon during a previous contacting with a hydrocarbon charge stock at an elevated temperature. The first step of this preferred embodiment is the carbon-burning step and it involves contacting the deactivated catalyst with a substantially sulfur compound-free gaseous mixture comprising about 0.5 to about 2 mole percent $O_2$ and about 0.1 to about 10 mole percent $H_2O$, at combustion conditions, including a pressure of about 1 to about 7 atmospheres and a temperature of about 375 to about 475° C., for a first period sufficient to substantially remove said carbonaceous materials. Following this carbon-burning step, the catalyst resulting therefrom is subjected to contact with a substantially sulfur compound-free gaseous mixture comprising about 15 to about 25 mole percent $O_2$, about 1 to about 10 mole percent $H_2O$, and about 1 to about 4 mole percent of chlorine or chlorine-containing compound for a second period of at least about 1 to about 5 hours at halogen treating conditions, including a temperature of about 500 to about 550° C. and a pressure of about 1 to 7 atmospheres. Thereafter, oxygen and water are purged from contact with the catalyst with a substantially water-free gas stream. In the final step the resulting catalyst is subjected to contact with a substantially water-free and sulfur compound-free hydrogen stream at reduction conditions, including a temperature of about 450 to about 550° C. for a final period of at least about 0.5 to about 5 hours to produce a regenerated hydrocarbon conversion catalyst having activity, selectivity, and stability characteristics comparable to those possessed initially by the fresh catalyst.

Other objects and embodiments of the present invention encompass further details about the deactivated catalysts that can be regenerated thereby, the conditions and reagents used in each step of the regeneration method, and the mechanics associated with each of these steps. These embodiments and objects will be hereinafter disclosed in the following detailed description of each of the essential and preferred steps of the present invention.

The present invention encompasses a regeneration method which is applicable to a bimetallic catalyst containing a platinum group component, a rhenium component, and a halogen component combined with a porous carrier material. Although the regeneration procedure is specifically directed to the regeneration of a catalyst containing platinum, it is intended to include within its scope other platinum group metals such as palladium, rhodium, ruthenium, osmium, and iridium. The platinum group component may be present in the catalyst as the elemental metal or as a suitable compound such as the oxide, sulfide, etc. or in chemical combination with the carrier material or other ingredients, although it is generally preferred that it be used in the reduced state (i.e. the elemental metal state). Generally, the amount of the platinum group metallic component present in the deactivated catalyst is small compared to the quantities of the other components combined therewith. In fact, the platinum group metallic component preferably comprises about 0.01 to about 1 wt. percent of the deactivated catalytic composite calculated on a carbonaceous material-free and elemental basis. Excellent results are obtained when the catalyst contains about 0.1 to about 0.9 wt. percent of the platinum group metal on the same basis.

Another essential constituent of the bimetallic catalyst regenerated by the method of the present invention is the rhenium component. This component may be present as an elemental metal or as a chemical compound such as the oxide, sulfide, halide, or in a physical or chemical association with the carrier material and/or other components of the catalyst. Generally, the rhenium compenent is utilized in an amount sufficient to result in the deactivated catalytic composite containing about 0.01 to about 1 wt. percent rhenium, calculated on a carbonaceous material-free and elemental basis. The rhenium component may be incorporated in the catalytic composite in any suitable manner and at any stage of the preparation of the catalyst. The preferred procedure for incorporating the rhenium component involves the impregnation of the carrier material either before, during, or after the other components referred to herein are added. The impregnation solution is generally an aqueous solution of a suitable rhenium salt such as ammonium perrhenate, sodium perrhenate, potassium perrhenate, and the like salts. However, the preferred impregnation solution is an aqueous solution of perrhenic acid. In general, the carrier material can be impregnated with the rhenium component either prior to, simultaneously with, or after the platinum group component is added to the carrier. However, best results are achieved when the rhenium compound is impregnated simultaneously with the platinum group component. In fact, a preferred impregnation solution contains chloroplatinic acid, hydrogen chloride, and perrhenic acid.

Yet another component of the catalyst regenerated by the method of the present invention is a halogen component. Although the precise form of the chemistry of the association of the halogen component with the carrier material is not entirely known, it is customary in the art to refer to the halogen component as being combined with the carrier material or with the other ingredients of the catalyst in the halide state (i.e. as chloride or fluoride). This combined halogen may be either chlorine, fluorine, iodine, bromine, or mixtures thereof. Of these, chlorine and fluorine are preferred, with best results obtained with chlorine. The halogen may be added to the carrier material in any suitable manner either during preparation of the support or before or after the addition of the platinum metal and rhenium components. The halogen component is typically combined with the carrier material in amounts sufficient to result in the deactivated catalyst containing about 0.1 to about 1.5 wt. percent halogen and preferably about 0.7 to about 1.2 wt. percent halogen, calculated on a carbonaceous material-free basis.

As indicated above, the catalyst that is regenerated by the method of the present invention contains a porous carrier material. Although any porous, refractory carrier material known to those skilled in this art may be used, the preferred material is a refractory inorganic oxide and, more specifically, alumina. This preferred alumina material is typically a porous absorptive, high surface area support having a surface area of about 25 to about 500 or more m.²/g. Suitable alumina materials are the crystalline aluminas known as gamma-, eta-, and theta-alumina, with gamma- or eta-alumina giving best results. In addition, in some embodiments the alumina carrier material may contain minor proportions of other well known refractory inorganic oxides such as silica, zirconia, magnesia, etc. However, the preferred carrier material consists essentially of gamma- or eta-alumina; in fact, an especially preferred alumina carrier material has an apparent bulk density of about 0.3 g./cc. to about 0.7 g./cc. and surface area characteristics such that the average pore diameter is about 20 to about 300 angstroms, pore volume is about 0.1 to about 1 ml./g. and the surface area is about 100 to about 500 m.²/g. An exemplary procedure for preparing a preferred alumina carrier material comprising spherical particles is given in the teachings of U.S. Pat. 2,620,314.

After impregnation of the catalytic components into the porous carrier material, the resulting composite is, in the preferred method of preparing this type of bimetallic catalyst, typically subjected to a conventional drying step at a temperature of about 200° F. to about 600° F. for a period of about 1 to 24 hours. Thereafter, the dried composite is typically calcined or oxidized at a temperature of about 700° F. to about 1100° F. in an air stream for a period of about 0.5 to 10 hours. Moreover, conventional pre-reduction and presulfiding treatments are typically performed in the preparation of catalytic composites which are regenerated by the method of the present invention. In fact, it is preferred to incorporate about 0.01 to about 0.5 wt. percent of sulfur component into the subject catalyst by a conventional presulfiding step.

In a preferred embodiment, the catalyst regenerated by the present invention is a combination of a platinum component, a chlorine component, and a rhenium component with an alumina carrier material. These components are preferably present in amounts sufficient to result in the catalyst containing, on a carbonaceous material-free and elemental basis, about 0.7 to 1.2 wt. percent chlorine, about 0.01 to about 1 wt. percent platinum, and about 0.01 to about 1 wt. percent rhenium.

The principal utility for this type of bimetallic catalyst is in a hydrocarbon conversion process wherein a dual-function hydrocarbon conversion catalyst having a hydrogenation-dehydrogenation function and an acid-acting function has been traditionally used; for example, these catalysts are used in a catalytic reforming process, with excellent results. In a typical reforming process, a hydrocarbon charge stock boiling in the gasoline range and hydrogen are contacted with the catalyst of the type described above in a conversion zone at reforming conditions. The hydrocarbon charge stock will typically comprise hydrocarbon fractions containing naphthenes and paraffins that boil within the gasoline range. The preferred class of charge stocks include straight run gasolines, natural gasolines, synthetic gasolines, etc. The gasoline charge stock may be a full boiling range gasoline having an initial boiling point of about 50 to about 150° F., and an end boiling point within the range of about 325 to 425° F., or it may be a selective fraction thereof which generally will be a higher boiling fraction commonly referred to as a heavy naptha—for example, a naphtha boiling in the range of $C_7$ to 400° F. provides an excellent charge stock. In general, the conditions used in the reforming process are: a pressure of about 0 to about 1000 p.s.i.g. with the preferred pressure being 100 to about 600 p.s.i.g., a temperature of about 800 to about 1100° F. and preferably about 900 to about 1050° F., a hydrogen to hydrocarbon mole ratio of about 1 to about 20 moles of $H_2$ per mole of hydrocarbon and preferably about 4 to about 10 moles of $H_2$ per mole of hydrocarbon, and a liquid hourly space velocity (which is defined as the equivalent liquid volume flow rate per hour of the hydrocarbon charge stock divided by the volume of the bed of catalyst particles) of about 0.1 to about 10 hr.$^{-1}$, with a value in the range of about 1 to about 3 hr.$^{-1}$ giving best results.

It is preferred to operate the hydrocarbon conversion process using this type of bimetallic catalyst with injection of a halogen or a halogen-containing compound into the feed stream thereto in order to maintain the halogen component of the catalyst at a relatively high level. In particular, it is preferred to add about 1 to about 20 wt. p.p.m., based on the charge stock, of chlorine or chlorine-containing compounds such as the alkyl chlorides to the charge stock to the process either on a continuous or intermittent basis. The exact amount of halogen added to the process in this fashion is usually determined as a function of the amount of water which is continuously entering the conversion zone and numerous techniques are available for developing the proper correlation between water level entering the conversion zone and the precise amount of halogen which must be added to the feed stream in order to maintain the halogen component of the catalyst at the desired level. For a given charge stock and process these correlations are easily developed by experimental methods well known to those skilled in the art. Regardless of how the halogen component of the catalyst is maintained, it is preferred that it be at a relatively high level before the regeneration procedure described herein is commenced. Specifically, the deactivated hydrocarbon conversion catalyst which is subjected to the method of the present invention should contain at least about 0.1 to about 1.5 wt. percent of the halogen component, calculated on a carbonaceous material-free and an elemental basis, and, more particularly, about 0.7 to about 1.2 wt. percent.

When the bimetallic catalysts of the type described above are employed in the conversion of hydrocarbons, particularly the catalytic reforming process outlined above, the activity, selectivity, and stability of these catalysts are initially quite acceptable. For example, in a reforming process this type of bimetallic catalyst has several singular advantages, among which are increased $C_5^+$ yield, decreased rate of coke laydown on the catalyst, increased hydrogen make, enhanced stability of both $C_5^+$ yield and temperature necessary to make octane, and excellent catalyst life before regeneration becomes necessary. However, the gradual accumulation of coke and other deactivating carbonaceous deposits on the catalyst will eventually reduce the activity and selectivity of the catalyst to a level such that regeneration is desirable. Ordinarily, regeneration becomes desirable when about 0.5 to about 15 wt. percent or more of carbonaceous deposits have been formed upon the catalyst.

When the performance of the catalyst has decayed to the point where it is desired to regenerate the catalyst, the introduction of the hydrocarbon charge stock into the conversion zone containing the catalyst is stopped and the conversion zone purged of free hydrogen and hydrocarbons with a suitable gas stream. Thereafter, the regeneration method of the present invention is performed either in situ or the catalyst may be unloaded from the conversion zone and regenerated in an off-line facility.

An essential feature of the present regeneration procedure is the presence of halogen or a halogen-containing compound in the gaseous mixture used during the halogen-treating step. Although a halogen gas such as chlorine or bromine may be used for this purpose, it is generally more convenient to employ a halogen-containing compound such as an alkyl halide, which upon exposure to the conditions utilized in these steps is decomposed to form the corresponding hydrogen halide. In addition, the hydrogen halide may be used directly; in fact best results are achieved when a hydrogen halide is used directly in the gaseous mixture. In general, chlorine or chlorine-containing compounds are the preferred additives for use in this halogen treating step, with the other halogens typically giving less satisfactory results. The preferred mode of operation involves use of hydrogen chloride in the gas mixture used in the halogen-treating step regardless of the type of halogen component contained in the catalyst. In fact, an especially preferred procedure involves the injection of an aqueous solution of hydrogen chloride into the gaseous mixture used in the halogen-treating step. The mole ratio of $H_2O$ to halogen in the gaseous mixture employed in this step in the preferred procedure will range from about 2:1 to about 100:1, with a mole ratio of about 2:1 to 20:1 giving the best results. Operation of the halogen treating step in this fashion insures that the halogen component of the regenerated catalyst is adjusted to a value corresponding to 0.7 to 3 wt. percent of the catalyst at the end of this step.

It is to be recognized that another essential feature of the subject regeneration method is that the composition of the gas streams used in the various steps thereof are carefully controlled, and the positive requirements for the composition of the gas streams used during the carbon-burning step and the halogen-treating step are given hereinafter in a manner which specifically includes the precise amounts of active ingredients needed and specifically excludes detrimental ingredients. In particular, it is a critical feature of the present invention that the gas streams used during the carbon-burning step and the halogen-treating step are substantially free of compounds of sulfur—particularly, oxides of sulfur and $H_2S$. Quantitatively, this means less than 5 vol. p.p.m. sulfur and preferably less than 2 vol. p.p.m. Likewise, it is essential that the hydrogen stream used during the reduction step be substantially free of both water and sulfur compounds such as $H_2S$. That is, less than 10 vol. p.p.m. in the case of water and less than 5 vol. p.p.m. in the case of sulfur. It is, therefore, evident that the gas streams used in each of the steps of the present invention may be once-through streams or recycle streams; provided that in this latter case, the recycle streams are carefully controlled to insure that the positive limitations given hereinafter on the contents of the various gas streams are satisfied, and are treated by conventional techniques to insure the absence of detrimental constituents therefrom. Furthermore, it is to be noted that the temperatures and pressures given hereinafter for each of the steps refer to the temperature and pressure of the gas stream used therein just before it contacts the catalyst.

According to the present invention, the first essential step of the regeneration procedure is the carbon-burning step and it involves contacting the deactivated catalyst with a gaseous mixture comprising about 0.2 to about 3 mole percent $O_2$, about 0.02 to about 25 mole percent $H_2O$, and an inert gas such as nitrogen, helium, carbon dioxide, etc., or mixtures of these. In a preferred mode of operation, the gaseous mixture used in this step contains about 0.5 to about 2 mole percent $O_2$, about 0.1 to about 10 mole percent $H_2O$ and an inert gas. The combustion conditions utilized in this step are: a temperature of about 350 to 500° C., with best results obtained at a temperature of about 375 to about 475° C., a pressure sufficient to maintain the flow of the first gaseous mixture through the zone containing the deactivated catalyst, such as a pressure of about 1 to 35 atmospheres and preferably about 1 to about 7 atmospheres, and a gas hourly space velocity (defined as the volume rate of the flow of the gas stream per hour at standard conditions divided by the volume of the bed of catalyst particles) of about 100 to about 25,000 hr.$^{-1}$, with a preferred value of about 3,000 to about 7,000 hr.$^{-1}$. This carbon-burning step is performed for a period sufficient to substantially remove carbonaceous materials from the catalyst. In general, depending obviously upon the amount of carbonaceous material present on the catalyst, a first period of about 1 to about 30 or more hours is adequate in most cases, with best results usually obtained in about 2 to 10 or more hours. Ordinarily, this step is terminated when the differential temperature across the zone containing the catalyst is less than 1° C. for a period of about 0.5 to 5 hours.

The second essential step of the present regeneration method is the halogen treating step and involves subjecting the catalyst resulting from the carbon-burning step, to contact with a gaseous mixture comprising about 4 to about 25 mole percent $O_2$, about 1 to about 30 mole percent $H_2O$, about 0.05 to about 5 mole percent of a halogen or a halogen-containing compound and an inert gas which is typically nitrogen. The temperature utilized in this step is preferably at least 25° C. higher than that used in the carbon-burning step, with best results obtained at higher temperatures of about 500 to about 550° C. The other conditions utilized in this step are preferably the same as used in the carbon-burning step. The duration of this step is at least about 0.5 to about 10 hours, with excellent results usually obtained in about 1 to about 5 hours. In a preferred mode of operation, the gaseous mixture used in this step contains a markedly larger amount of oxygen than in the carbon-burning step; more specifically it comprises about 15 to about 25 mole percent $O_2$, about 0.1 to about 10 mole percent $H_2O$, about 1 to about 4 mole percent halogen or a halogen-containing compound and an inert gas. An especially preferred embodiment of this step involves the use of a temperature of about 500 to about 510° C. and a pressure of about 1 to about 7 atm. for a contact time of about 1 to about 2 hours. The function of this halogen-treating step is to insure that halogen content of the catalyst is adjusted to a high level before the reduction step is performed and also to redistribute the metallic components of the catalyst.

After the halogen-treating step is performed on the catalyst, nitrogen or another inert gas is used to displace oxygen and water therefrom. This purge step is performed for a period of time which can be easily determined by monitoring the effluent gases from the zone containing the catalyst to determine when they are substantially free of oxygen and water (i.e., preferably less than 10 vol. p.p.m. of $H_2O$ and less than 5 vol. p.p.m. $O_2$). This step is preferably performed at a relatively high temperature; for example, 300 to 600° C., with a preferred range being 450 to 500° C. In a preferred embodiment of this purge step, water is first purged from the contact with the catalyst with a dry air stream and then an oxygen-free inert gas is used to remove free oxygen.

Following this purge step, the final essential step of the present invention is commenced. It involves contacting the resulting dried catalyst with a substantially water-free and sulfur compound-free hydrogen stream at a temperature of about 400 to about 600° C. for a final period of at least about 0.5 to about 5 hours. The preferred conditions for this step are a temperature of 450 to 550° C. for a period of at least about 0.5 to 2 hours. Once again, the pressure and gaseous flow rates utilized in this step are preferably identical to those reported in conjunction with the discussion of the carbon-burning step. The purpose of this reduction step is to reduce the metallic components of the catalyst essentially to an elemental state and to produce a regenerated catalyst having activity, selectivity, and stability characteristics comparable to those possessed initially by the fresh bimetallic catalyst.

In many cases it is advantageous to subject the regenerated catalyst obtained from the reduction step to an additional sulfiding treatment step before it is returned to hydrocarbon conversion service. Although any method known to the art for sulfiding a catalyst can be utilized, the preferred procedure involves contacting a suitable sulfide-producing compound with the reduced catalyst at a temperature of about 20 to 550° C. for a period sufficient to incorporate about 0.01 to about 0.5 wt. percent sulfur. The sulfide-producing compound utilized may be selected from the volatile sulfides, the mercaptans, the disulfides and the like compounds; however, best results are ordinarily obtained with hydrogen sulfide. The hydrogen sulfide may be utilized by itself or in admixture with a suitable carrier gas such as hydrogen, nitrogen or the like. Good results have been obtained at a temperature of 375° C. and a pressure of 100 p.s.i.g. with a mixture of $H_2$ and $H_2S$.

Following this reduction step, or the optional sulfiding step, the hydrocarbon conversion process in which the bimetallic catalyst is utilized may be restarted by once again charging the hydrocarbon stream in the presence of hydrogen to the zone containing the catalyst at reaction conditions designed to produce the desired product. In the preferred case, this involves re-establishing reforming conditions within the zone containing the catalyst.

The following working example is given to illustrate further the regeneration method of the present invention. It is intended to be illustrative rather than restrictive.

EXAMPLE

A deactivated bimetallic catalyst, containing, on a carbonaceous material free and elemental basis, about 0.375 wt. percent platinum, about 0.2 wt. percent rhenium and about 0.9 wt. percent chlorine, is analyzed and found to contain about 15 wt. percent carbonaceous materials. The deactivated catalyst is then regenerated according to the four step method of the present invention.

In the carbon-burning step, a first gaseous mixture comprising about 0.6 mole percent $O_2$, about 7.5 mole percent $H_2O$ and nitrogen is contacted with the deactivated catalyst at combustion conditions. The gaseous mixture contains less than 2 vol. p.p.m. of sulfur compounds. The combustion conditions utilized are a temperature of 440° C., a pressure of 80 p.s.i.g. and a gas hourly space velocity (GHSV) of 4800 hr.$^{-1}$. This step is continued until the differential temperature across the zone containing the catalyst is essentially zero for 1 hour. The gaseous mixture is supplied on a once-through basis.

After the carbon-burning step, the resulting catalyst is then contacted with a second gaseous mixture comprising 19.3 mole percent $O_2$, 6 mole percent $H_2O$, 3 mole percent HCl and nitrogen at treating conditions, including a temperature of 510° C., a pressure of 80 p.s.i.g. and a GHSV of 4800 hr.$^{-1}$, for a period of 1 hour. The second gaseous mixture is supplied on a once-through basis and contains less than 2 vol. p.p.m. of sulfur compounds.

The resulting halogen-treated catalyst is then subjected to a drying step with an air stream containing less than 5 vol. p.p.m. $H_2O$ at a temperature of about 500° C. until the effluent gas stream from the zone containing the catalyst contains less than 5 vol. p.p.m. $H_2O$. Thereafter, residual free oxygen is purged from contact from the catalyst with an $H_2O$- and $O_2$-free nitrogen stream until the effluent gas stream shows less than 1 vol. p.p.m. $O_2$.

The resulting dried catalyst is then contacted with a hydrogen stream at reduction conditions, including a temperature of about 510° C., a 400 hr.$^{-1}$ GHSV, and a pressure of about 80 p.s.i.g., for a period of about 2 hours. The hydrogen stream utilized contains less than 10 vol. p.p.m. $H_2O$ and less than 2 vol. p.p.m. of sulfur compounds. It is used on a once-through basis.

The resulting regenerated catalyst recovered from the reduction step is found to have essentially the same activity, selectivity and stability characteristics as the fresh catalyst.

It is within the scope of the present invention to apply the regeneration procedure disclosed herein to other types of bimetallic catalysts that have properties and problems which are analogous to those associated with the platinum-rhenium catalyst described hereinbefore. A case in point involves a bimetallic catalyst comprising a combination of catalytically effective amounts of a platinum group component, a group IVA metallic component (i.e. a component selected from the group consisting of tin, germanium, lead and compounds thereof) and a halogen component with a porous carrier material. More specifically, the regeneration of a carbon-deactivated bimetallic catalyst of this last type can be accomplished by means of the procedure of the present invention.

It is intended to cover, by the following claims, all changes and modifications of the above disclosure of the present invention that would be self-evident to a man of ordinary skill in the catalyst regeneration art.

I claim as my invention:

1. A method for regenerating a deactivated hydrocarbon conversionn catalyst comprising a combination of a platinum group component, a rhenium component and a halogen component with alumina, the catalyst having been deactivated by deposition of carbonaceous materials thereon during a previous contacting with a hydrocarbon charge stock at an elevated temperature, said method comprising the steps of:
   (a) contacting the deactivated catalyst with a substantially sulfur compound-free gaseous mixture consisting essentially of about 0.5 to about 2 mole percent $O_2$, and about 0.1 to about 10 mole percent $H_2O$ and an inert gas at combustion conditions, including a pressure sufficient to maintain flow of said mixture through the catalyst and a temperature of about 350 to about 500° C., for a first period sufficient to substantially remove said carbonaceous materials;
   (b) subjecting the catalyst resulting from step (a) to contact with a substantially sulfur compound-free gaseous mixture comprising about 4 to about 25 mole percent $O_2$, about 1 to about 30 mole percent $H_2O$, and about 0.05 to about 5 mole percent of halogen or a halogen-containing compound at halogen treating conditions, including a temperature at least about 25° C. higher than that utilized in step (a) and a pressure sufficient to maintain flow of said mixture through the catalyst, for a second period of at least about 0.5 to about 10 hours;
   (c) purging oxygen and water from contact with the catalyst resulting from step (b) with a gas stream; and
   (d) subjecting the catalyst resulting from step (c) to contact with a substantially water-free and sulfur compound-free hydrogen stream at reduction conditions, including a temperature of about 400 to about 600° C. and a pressure sufficient to maintain flow of the hydrogen stream through the catalyst, for a final period of at least about 0.5 to about 5 hours.

2. A method as defined in claim 1 wherein the platinum group component of the catalyst is platinum.

3. A method as defined in claim 1 wherein the platinum group component of the catalyst is palladium.

4. A method as defined in claim 1 wherein the halogen component of the catalyst is chlorine.

5. A method as defined in claim 1 wherein the halogen component of the catalyst is fluorine.

6. A method as defined in claim 1 wherein the alumina carrier material is gamma- or eta-alumina.

7. A method as defined in claim 1 wherein the deactivated catalyst contains, on a carbonaceous material-free and elemental basis, about 0.1 to about 1.5 wt. percent halogen, about 0.01 to about 1 wt. percent platinum group metal and about 0.01 to about 1 wt. percent rhenium.

8. A method as defined in claim 1 wherein the deactivated catalyst comprises a combination of the platinum component, a chlorine component and a rhenium component with an alumina carrier material in amounts sufficient to result in a catalyst containing, on a carbonaceous material-free and elemental basis, about 0.1 to about 1.5 wt. percent chlorine, about 0.01 to about 1 wt. percent platinum and about 0.01 to about 1 wt. percent rhenium.

9. A method as defined in claim 1 wherein the halogen component of the deactivated catalyst is chlorine and the halogen or halogen-containing compound utilized in step (b) is chlorine or hydrogen chloride.

10. A method as defined in claim 1 wherein the gaseous mixture utilized in step (a) comprises about 0.5 to about 2 mole percent oxygen, about 0.1 to about 10 mole percent $H_2O$ and an inert gas.

11. A method as defined in claim 1 wherein the gaseous mixture utilized in step (b) comprises about 15 to 25 mole percent $O_2$, about 1 to about 10 mole percent $H_2O$, about 1 to about 4 mole percent of a halogen or a halogen-containing compound, and an inert gas.

12. A method for regenerating a deactivated hydrocarbon catalyst comprising a combination of a platinum group component, a rhenium component and a halogen component with alumina, the catalyst having been deactivated by deposition of carbonaceous materials thereon during a previous contacting with a hydrocarbon charge stock at an elevated temperature, said method comprising a combination of the method defined in claim 1 with the step of sulfiding the catalyst resulting from step (d) by contacting same at a temperature of about 20 to 550° C. with a sulfide-producing compound in an amount sufficient to result in a regenerated catalyst containing about 0.01 to about 0.5 wt. percent sulfur.

13. A method as defined in claim 12 wherein the sulfide-producing compound is $H_2S$.

14. A method as defined in claim 1 wherein the combustion conditions utilized in step (a) include a temperature of about 375 to about 475° C.

15. A method as defined in claim 1 wherein the halogen treating conditions utilized in step (b) include a temperature of about 500 to 550° C.

16. A method as defined in claim 1 wherein the reduction conditions utilized in step (d) include a temperature of about 450 to about 550° C.

17. A method as defined in claim 1 wherein the mole ratio of water to halogen utilized in step (b) is selected from the range of about 2:1 to about 100:1.

References Cited

UNITED STATES PATENTS

| 3,654,142 | 4/1972 | Moravec, Jr. et al. | 252—415 |
| 3,496,096 | 2/1970 | Kluksdahl | 252—415 |
| 3,558,479 | 1/1971 | Jacobson et al. | 252—415 |
| 3,578,582 | 5/1971 | Jacobson | 208—140 |
| 3,658,691 | 4/1972 | Keith et al. | 208—139 |
| 3,634,292 | 1/1972 | Hayes | 252—415 |
| 3,642,656 | 2/1972 | Hayes | 252—419 |

DANIEL E. WYMAN, Primary Examiner

P. E. KONOPKA, Assistant Examiner

U.S. Cl. X.R.

208—140; 252—419